May 23, 1961  M. C. CLERC  2,985,392
APPARATUS FOR WINDING A COIL ON A CLOSED CORE
Filed July 10, 1958
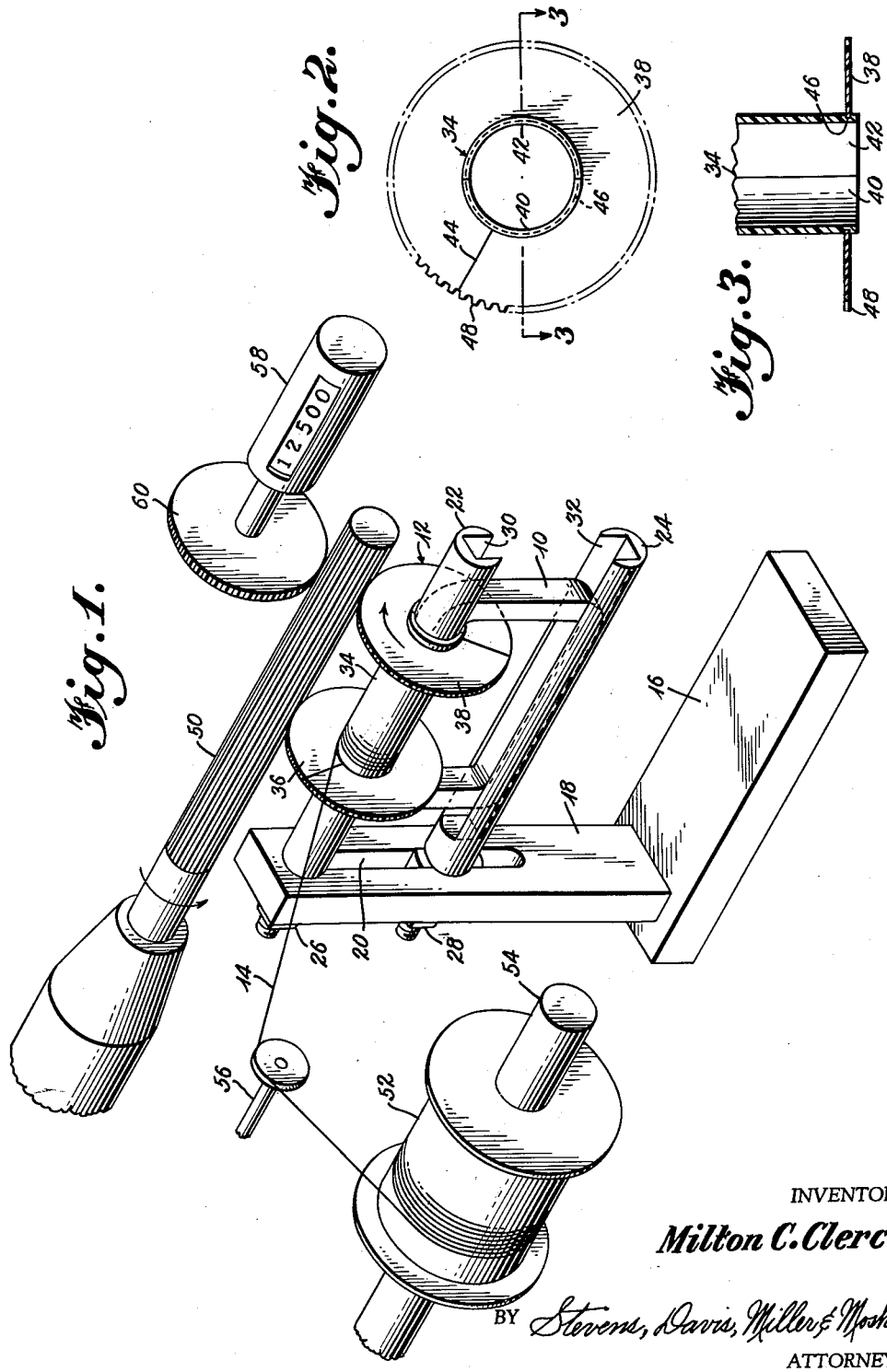
INVENTOR
Milton C. Clerc
BY Stevens, Davis, Miller & Mosher
ATTORNEYS

United States Patent Office 2,985,392
Patented May 23, 1961

2,985,392

APPARATUS FOR WINDING A COIL ON A CLOSED CORE

Milton C. Clerc, Houston, Tex., assignor to Texas Instruments Incorporated, Dallas, Tex., a corporation of Delaware Filed July 10, 1958, Ser. No. 747,754

4 Claims. (Cl. 242—9)

This invention relates to improvements in an apparatus for winding a coil on a closed magnetic core of an inductance device.

The winding of a coil on a closed magnetic core has, in the past, been a problem as the coil cannot be wound on a spool and then slipped over a portion of the core. The solution which has been usually practiced involves winding the coil on a multipart spool, preassembled on one leg or a portion of the closed magnetic core. Several devices have heretofore been proposed for winding a coil on a closed magnetic core utilizing a spool which can be disassembled. It is to this type of apparatus that this invention relates.

Accordingly, it is an object of this invention to provide an improved apparatus for winding a coil on a closed core and especially to provide an improved construction for a separable spool assembly and support therefor.

It is an additional object of this invention to provide an improved device for supporting a closed core during winding such that a rotatable spool can be positioned around the support and a portion of the core, the support, in the circumstances of the invention, functioning as a bearing for the rotatable spool.

It is a further object of this invention to provide an improved multi-component spool which can be assembled around a leg of a closed magnetic core, this spool being rigid and inexpensive in construction.

It is a still further object of this invention to provide a spool which can be assembled on a closed core for winding a coil thereon and which, then, can be permanently attached thereto after the coil has been wound.

Other objects and advantages of this invention will be apparent from the following detailed description taken in connection with the accompanying drawing, disclosing by way of example the principles of this invention and the best mode which has been contemplated of applying the principles.

In the drawing:

Fig. 1 is a perspective view of the apparatus of this invention illustrating the winding of a coil on a closed magnetic core;

Fig. 2 is an end elevation view of the coil spool in its assembled position;

Fig. 3 is a sectional view taken along line 3—3 of Fig. 2.

In general, this invention relates to an apparatus especially adapted for winding a coil on a closed magnetic core, but not limited thereto. The invention contemplates assembling a spool consisting essentially of a drum and flanges around one leg of the core, over a stationary bearing shaft, and then, rotating the spool by driving the flanges thereof. The spool is of an improved construction and composed of a novel split drum and split flange arrangement designed so that the parts can be assembled on the bearing shaft and held together without additional securing means.

Referring to the drawings, in Fig. 1 a closed magnetic core 10 is provided with a core spool assembly 12 which has been assembled on one leg thereof. Suitable wire 14 is being wound on the spool to produce the coil.

The apparatus of the present invention comprises a base 16 having an upright support 18 secured thereto and this upright support has a longitudinal slot 20 defined therein. Projecting outward from the upright support 18 are a pair of stationary bearing shafts 22 and 24 which are adjustably secured to the upright 18 by suitable screw and nut means 26 and 28. The shafts 22 and 24 have grooves 30 and 32, respectively, of suitable configuration therein for the purpose of receiving opposing legs of the magnetic core 10 to support the same rigidly in a single position. Since the grooves 30 and 32 are shaped to receive the core 10, it will be apparent that different cores with different cross sections can be supported using corresponding complementary-shaped grooves in the bearing shafts 22 and 24.

The spool assembly 12 consists of a split drum 34 and a pair of end flanges 36 and 38. As shown in Figs. 2 and 3, the spool drum 34 is composed of a pair of sections 40 and 42 which fit together to form the completed drum. The splits between sections 40 and 42 are longitudinal of the axis of the spool. Each of the end flanges 36 and 38 is radially split at 44, to facilitate assembling these end flanges onto the split drum 34 of the spool. The split drum 34 has a pair of peripheral retainer grooves 46, one in each end thereof as shown in Fig. 3. The spool components are made of an insulating material having sufficient resiliency to be assembled on the bearing shaft around the gapless core leg, such as a thin linen base plastic material cut into suitable form. Each end flange has a plurality of teeth 48 cut on the periphery thereof. These teeth are adapted to mesh with the teeth on a pinion shaft 50 which is rotatably driven by means not shown, when it is desired to wind a coil on the drum 34 of the coil spool 12.

The wire 14 for the coil is unwound from a wire spool 52 mounted rotatably on a shaft 54. The wire 14 is trained over a suitable tension device 56. A turns counter 58 is provided with a gear 60 having the same number of teeth as the spool flanges 36 and 38 and is in mesh with the driving pinion 50 such that it will indicate the number of turns the spool flanges have rotated and hence, the number of turns of wire wound on the coil.

The operation of the apparatus will now be described. The closed core 10 is assembled in grooves 30 and 32 of the bearing shafts 22 and 24 and the shafts are adjustably secured by screw and nut elements 26 and 28 at a suitable height on the upright supoprt 16. The split halves 40 and 42 of the spool drum 34 are assembled on the bearing shaft 22 around one leg of the core 10 and the end flanges 36 and 38 are positioned thereon in the retainer grooves 46 on each end of the drum 34, thus holding the spool together. The wire 14 is started on the drum 34 of the spool 12 by any suitable means and the pinion shaft 50 is rotated, thereby driving the spool 12, through the gears 48 on the periphery of flanges 36 and 38, to wind the desired amount of coil turns thereon. These turns will be indicated by the turns counter 58. After the coil is wound on the spool and on the leg of the closed core, the core and spool are removed from the winding apparatus by sliding the assembly off the free ends of shafts 22 and 24. The spool is subsequently secured to the coil by any suitable means, such as "potting," in a manner well known in the art.

If extra rigidity is desired after the spool is assembled, it can be cemented together. Further rigidity can be obtained by winding an adhesive tape on the drum 34.

A preferred embodiment has been disclosed to enable one skilled in the art to practice this invention. It will be apparent, however, that various modifications may be made by one skilled in the art without departing from the inventive teachings. For example, the spool and the end pieces can be driven by friction means, such as a rubber drive roller, and the turns counter could be any other type of turns counter. Therefore, the invention is not to be limited by the above-described embodiment, but only by the spirit and scope of the appended claims.

What is claimed is:

1. An apparatus for winding a coil around one leg of a closed loop core comprising a base member, a bearing shaft cantilever mounted on said base member extending from said base a distance greater than the length of said one leg and defining an axial groove extending from the free end of said shaft toward the base member support means spaced from and providing a surface substantially parallel to said shaft, said core adapted to be slidably retained between said shaft and said support means with the one leg of said core about which a coil is to be wound substantially completely received in said groove defined by said shaft and the leg of said core opposite therefrom engaged by said surface of said support means whereby said core can be removed from between said shaft and said support means by merely sliding said core parallel to the axis of said shaft in the direction of the free end of said shaft, spool means assembled around said shaft and said one leg of said core, and means to drive said spool means to wind a coil thereon whereafter said core, spool means and coil are removed merely by sliding off the free end of said shaft.

2. An apparatus for winding a coil around one leg of a closed loop core comprising a base member, a bearing shaft cantilever mounted on said base member extending from said base a distance greater than the length of said one leg and defining an axial groove extending from the free end of said shaft toward the base member, support means spaced from and providing a surface substantially parallel to said shaft, said core adapted to be slidably retained between said shaft and said support means with the one leg of said core about which a coil is to be wound substantially completely received in said groove defined by said shaft and the leg of said core opposite therefrom engaged by said surface of said support means whereby said core can be removed from between said shaft and said support means by merely sliding said core parallel to the axis of said shaft in the direction of the free end of said shaft, a split cylindrical spool body having a retainer groove at each end thereof assembled around said shaft and said one leg of said core, a pair of flange members positioned in said retainer grooves and means to drive said spool body and flange members to wind a coil on said spool body between said flange members whereafter said core, spool body, flange members and coil are removed merely by sliding off the free end of said shaft.

3. An apparatus for winding a coil around one leg of a closed loop core comprising a base member, a first bearing shaft cantilever mounted on said base member extending from said base a distance greater than the length of said one leg and defining an axial groove extending from the free end of said first shaft toward the base member, a second shaft cantilever mounted on said base member and defining an axial groove extending from the free end thereof toward the base member, said shafts being mounted parallel to one another with the grooves facing each other, said core adapted to be slidably retained between said shafts with the one leg of said core about which a coil is to be wound substantially completely received in the groove defined by said first shaft and the leg of said core opposite therefrom received in the groove defined by said second shaft whereby said core can be removed from between said shafts by merely sliding said core parallel to the axis of said shafts in the direction of the free ends of said shafts, spool means assembled around said first shaft and said one leg of said core, and means to drive said spool means to wind a coil thereon whereafter said core, spool means, and coil are removed merely by sliding off the free ends of said shafts.

4. An apparatus for winding a coil around one leg of a closed loop core comprising a base member, a first bearing shaft cantilever mounted on said base member extending from said base a distance greater than the length of said one leg and defining an axial groove extending from the free end of said first shaft toward the base member, a second shaft cantilever mounted on said base member and defining an axial groove extending from the free end thereof toward the base member, said shafts being mounted parallel to one another with the grooves facing each other, said core adapted to be slidably retained between said shafts with the one leg of said core about which a coil is to be wound substantially completely received in the groove defined by said first shaft and the leg of said core opposite therefrom received in the groove defined by said second shaft whereby said core can be removed from between said shafts by merely sliding said core parallel to the axis of said shafts in the direction of the free ends of said shafts, a split cylindrical spool body having a retaining groove at each end thereof assembled around said first shaft and said one leg of said core, a pair of flange members positioned in said retainer grooves and means to drive said spool body and flange members to wind a coil on said spool body between said flange members whereafter said core, spool body, flange members and coil are removed merely by sliding off the free ends of said shafts.

References Cited in the file of this patent

UNITED STATES PATENTS

| | | |
|---|---|---|
| 2,334,131 | Schultz | Nov. 9, 1943 |
| 2,366,977 | Morrison | Jan. 9, 1945 |
| 2,452,733 | Conklin | Nov. 2, 1948 |